US008510076B2

(12) United States Patent  (10) Patent No.: US 8,510,076 B2
Green et al.  (45) Date of Patent: Aug. 13, 2013

(54) SENSOR APPARATUS AND SYSTEM

(75) Inventors: David John Green, Malvern (GB);
Dean Alastair Robert Beale, Malvern
(GB); Andrew Linton Hume, Malvern
(GB); Jason Senior, Malvern (GB)

(73) Assignee: Qinetiq Limited (GB)

( * ) Notice: Subject to any disclaimer, the term of this patent is extended or adjusted under 35 U.S.C. 154(b) by 1421 days.

(21) Appl. No.: 10/570,742

(22) PCT Filed: Sep. 2, 2004

(86) PCT No.: PCT/GB2004/003737
§ 371 (c)(1),
(2), (4) Date: Mar. 7, 2006

(87) PCT Pub. No.: WO2005/024751
PCT Pub. Date: Mar. 17, 2005

(65) Prior Publication Data
US 2007/0038395 A1  Feb. 15, 2007

(30) Foreign Application Priority Data
Sep. 9, 2003 (GB) .................................. 0321041.6

(51) Int. Cl.
*G01R 21/00* (2006.01)
(52) U.S. Cl.
USPC ........................................................ 702/150
(58) Field of Classification Search
USPC ........................................................ 702/150
See application file for complete search history.

(56) References Cited

U.S. PATENT DOCUMENTS

| 1,756,436 | A | 4/1930 | Pearson |
| 3,846,797 | A | 11/1974 | Brown et al. |
| 4,176,360 | A | 11/1979 | Leavy et al. |
| 4,598,296 | A | 7/1986 | Faigen |
| 5,264,863 | A | 11/1993 | Miner, Jr. et al. |
| 5,541,615 | A | 7/1996 | Koide et al. |
| 5,615,855 | A | 4/1997 | Marue et al. |
| 6,768,582 | B1 | 7/2004 | Hachkowski et al. |
| 7,231,741 | B2 | 6/2007 | Norwood |
| 2001/0004000 | A1 | 6/2001 | Qian et al. |
| 2003/0012168 | A1 | 1/2003 | Elson et al. |

(Continued)

FOREIGN PATENT DOCUMENTS

DE 100 13 084 9/2001
WO WO 01/26327 4/2001

OTHER PUBLICATIONS

W.D. Bryan, H. G. Nguyen, and D.W. Gage (Man-Portable Networked Sensor System, SPIE vol. 3394, Apr. 1998, p. 79-88).*

(Continued)

*Primary Examiner* — Tung S Lau
(74) *Attorney, Agent, or Firm* — McDonnell Boehnen Hulbert & Berghoff LLP

(57) ABSTRACT

The sensor module carries one or more sensor element, such as microphones or imaging devices, for detecting events in use. The sensor module has a locator for determining its location and preferably an orientation sensor for determining it location and a transceiver for communicating with other modules in the network or with a base station. The module also has a processor which is adapted such that, in use, the module communicates with other sensor modules and determines whether to operate in a sensing mode to detect events or a controlling mode. In this way a self organizing adaptive network is provided.

22 Claims, 3 Drawing Sheets

(56) References Cited

U.S. PATENT DOCUMENTS

| | | |
|---|---|---|
| 2003/0063585 A1 | 4/2003 | Younis et al. |
| 2003/0107488 A1 | 6/2003 | Van Putten |
| 2004/0046022 A1 | 3/2004 | Hassan-Zade et al. |
| 2007/0146227 A1 | 6/2007 | Brooks et al. |

OTHER PUBLICATIONS http://www.merriam-webster.com/dictionary/control, p. 1, May 5, 2008.*

ANSI/IEEE Std 802.1D, 1998 Edition, p. 1-355.*

\* cited by examiner

SENSOR APPARATUS AND SYSTEM

BACKGROUND OF THE INVENTION (1) Field of the Invention

This invention relates to a sensor apparatus and sensor system for event location and identification, particularly to a deployed sensor network for area monitoring.

(2) Description of the Art

There is a current desire to be able to identify and locate certain events in an environment. This is especially true in military applications where it is wished to locate events on a battlefield. Such events could be, for example, movement of vehicles or personnel, artillery fire, aircraft movement etc.

Detection of such events has, in the past, been conducted by reconnaissance teams. Obviously however there is a risk associated with such reconnaissance and achieving rapid forward deployment and area cover can be problematic.

There is therefore a requirement for a rapidly deployable sensor, preferably one that can be integrated into a system for monitoring of an extended area for event identification and location.

SUMMARY OF THE INVENTION

Thus according to the present invention there is provided a sensor module for use in a sensor network comprising at least one sensor, a locator for determining the location of the at least one sensor, a transceiver for communicating with other sensor modules and/or a base station and a processor wherein the processor is adapted, in use, to communicate with other sensor modules and to determine whether the sensor module should operate in a sensing mode or a controlling mode within the network.

The present invention therefore relates to a sensor module which can be deployed as part of a sensor network. The network comprises a plurality of sensor modules distributed across an area each detecting events in the vicinity. It is usual in sensor networks of this type to have at least two distinct types of module in the network; sensor modules which detect events and control modules which receive data from the sensor modules for possible analysis and transmission to a base station. The control modules are different in function to the sensor modules and so are different in design. They are often larger than the sensor modules as they typically consume more power so require larger batteries and also need to be able to transmit over longer distances. As a control module controls and processes the data from sensor modules in its vicinity that part of the network is entirely dependent on the operation of the control module. This makes the system vulnerable—if the control module, which has a different appearance and so is easily identified, is located and disabled then that part of the network is disabled. Also once the control module power is exhausted the relevant sensor modules become useless.

Further over time the region of interest may change and a control module may be deployed in an area that later becomes threatened.

The present invention therefore avoids the use of separate control and sensor modules and provides a sensor module with a processor which, in use, communicates with other sensor modules and determines whether to operate in a control mode or a sensor mode. Thus each sensor module is capable of acting as a control module or as a sensor module and operates according to the circumstances.

The circumstances affecting whether a sensor module acts in a control mode or a sensor mode may include the location of the module. For instance the processor may compare the location of the module with the location of other modules. A module close to or within an area of interest may operate in a sensor mode whereas another module not so located may operate in a control mode. The processor may also be adapted to consider the density of sensor modules in certain areas. For instance if two sensor modules are deployed very close to each other one may operate in sensor mode to detect events in that vicinity with the other operating in control mode so as to avoid redundant data gathering, thus freeing modules in less densely populated parts of the network to also operate in sensor mode. Alternatively where two sensor modules are located very near to each other in an area of interest a sensor not located in the area of interest could operate as a control module. In this case the control module may only operate one sensor module in sensor mode, the other being deactivated until the first runs out of power at which point the second can take over.

Other factors taken into account in deciding whether to operate in a control mode or a sensor mode could be the location in terms of environment. For instance a sensor module located in a valley might only be able to contact one or two other modules and so might not be suited for acting in control mode.

When acting in a sensing mode the processor monitors the output of the at least one sensor in order to detect events. The exact mode of operation will depend on the particular sensor or sensors carried by the module and the information it is desired to gather. For instance the sensor module may be provided with one or acoustic sensors such as microphones. In which case, in sensing mode, the processor may simply monitor the output of the microphones until a particular signal is detected. This could be an acoustic signal above a certain loudness threshold, say to detect weapons fire, or having a characteristic spectrum, say for detecting vehicular movement. Once a signal that meets the criteria has been received it may be processed by the processor to try to determine the origin of the sound and identify the cause of the sound. Alternatively the raw data may be sent to a sensor module acting in a control mode for data processing. Processing in the sensor module that actually receives the signal means that false alarms can be identified and discounted. Further the result of processing could be to categorise the event and therefore only a relatively short coded transmission need be sent to the module acting in the controlling mode. Sending a short message obviously reduces power needed for broadcast as compared with transmitting raw data. However processing requires power and processing in situ will deplete the power of the module acting in sensing mode more rapidly. Further the module acting in controlling mode may need to process the raw data from two nearby sensor modules to improve identification and/or location of events.

In another embodiment the sensor module could be provided with a memory to store received data and periodically process and/or transmit received data to the module acting in the control mode. For instance if the sensor was a visible band camera it may record a scene for a certain period and then process the captured data to detect events.

When acting in a controlling mode the processor receives information relating to events from the sensor modules, possibly processes the information, and passes anything of interest back to a base station, possibly via other sensor modules acting as relays. Having relays can reduce the power expended by any one module in broadcasting as each module need only transmit over a reduced range. The module in controlling mode may also monitor its own power levels and those of the sensor modules within its control and continue to assess how to maximise the network efficiency.

The determination of whether a particular sensor module acts in control mode or sensing mode is preferably made following initial deployment. However as mentioned the processor, at least when acting in control mode, may be adapted to review the situation either periodically or in response to certain occurrences. For instance a module acting in control mode may use more power than those acting in sensing mode and so may start to run out of power earlier. The processor may be adapted to monitor the power level and this could be used to switch a module from sensing mode to control mode to take over when the power of the current controlling sensor module fails. The sensor module therefore preferably is provided with a means for either determining or estimating the remaining power. Equally if the current control module is damaged or destroyed another module may take its place. Further the determination of whether a module acts in sensing mode or control mode may be influenced by events detected by the sensor modules, for instance detection of an event in an area not thought to be of interest may result in that area being reclassified as an area of interest with a consequential reorganisation of the network. Therefore a module in that reclassified area may be switched from controlling mode to sensing mode with another module in a different area then taking over as control module.

The present invention therefore provides a self organising sensor network that avoids vulnerability and increases flexibility. The invention is particularly advantageous when rapid deployment is required as careful consideration of the placement of the sensor modules is not required, the system will adapt to the placement and operate accordingly.

The invention is also very advantageous when the modules are deployed by an elevated platform such as gun launch or air drop. Deployment by these methods is inherently somewhat random and damage can sometimes occur on deployment. Were a control module deployed by this method there is the danger that it is damaged on deployment or rests in an area where it is unable to control all the sensor modules or contact the base station or is vulnerable to attack. The present invention reduces the dependence on a few control modules and so increases the likely effectiveness of the network.

Preferably the sensor module is deployable from a stowed configuration to a deployed configuration and more preferably it may automatically deploy from the stowed to the deployed configuration. Having a stowed configuration means that the sensor modules can be small and compact to handle and store and sensitive parts can be safely stowed within a rugged casing for protection. This is especially useful for gun launch and air drop deployment. The sensor module processor may have a safety and arming unit. When the safety is on the module will not deploy from the stowed to the deployed configuration. However when the safety is removed the module may automatically deploy when certain conditions are met. One criterion for deployment could be detection of rapid movement followed later by a determination that the sensor module has come to a rest. Alternatively the module may be adapted to deploy itself a certain time after arming. Other criteria for automatically deploying will be apparent to those skilled in the art.

The sensor module is preferably provided with a self righting means so as to ensure that during deployment the module deploys correctly. The outer casing of the module in the stowed configuration could be a series of hinged plates, each plate hinged about the base of the module and the module may comprise means for biasing at least some of the plates away from the module during deployment from the stowed configuration so as to stand the module on the base.

The sensor module may be provided with an extendable portion which is recessed in the stowed configuration and means for extending the extendable portion during deployment from the stowed configuration. The extendable portion may support one or more deployable arms and may conveniently be telescopic. Having a telescopic extendable portion allows the sensor module when deployed to deploy the at least one sensor at a height appropriate for that particular sensor and can also improve the transmission/receive capability of the device.

In the stowed configuration the sensor module is preferably able to be co-operatively stacked with other stowed sensor modules. Being able to stack the sensor modules allows for ease of storage and transport and can also lead to ease of deployment as more than one module may be deployed in the same gun launch or air drop.

Preferably the sensor module comprises a base portion which is releasably attachable to a payload portion, the base portion comprising the self righting means, transceiver, power unit and processor. This allows different sensor payloads to be used. interchangeably with a standard base unit. This allows for different sensors to be deployed in different situations or a variety of sensors modules to be deployed in the same environment to increase the capability of the network.

Conveniently the locator comprises a GPS receiver. GPS receivers can give very accurate positional information as is well known in the art. Conveniently a central GPS receiver may be used with the module being such that the spatial relationship of the or each sensor to the GPS receiver when the sensor module is deployed is known.

The sensor module may also comprise one or more orientation/attitude monitors to determine the orientation of the sensor module. The orientation of the sensor module is useful information that the processor can use to determine the data reference for that particular node in the network. Preferably a single orientation sensor is used and is capable of determining magnetic north, so that the directionality of the sensors can be determined, and also the orientation of the module with respect to vertical.

In one embodiment the at least one sensor comprises an acoustic sensor such as a microphone. Acoustic sensing can reveal very useful information about an environment such as a battlefield. For instance the sound of vehicle movement can give information about enemy deployment. Different events such as vehicle movement or artillery fire can give very distinctive acoustic signatures which can be detected and processed by the sensor modules. Preferably the sensor module has a plurality of acoustic sensors which, when the sensor is deployed, form a spaced array. Using an array of sensors information regarding the direction of origin of an acoustic wavefront can be gathered as the acoustic wave will pass the different sensors at different times. The processor can use this information to determine the location of an event. The sensor modules themselves of course form a spaced array and so can be used to give directional information about the origin of an acoustic event.

Preferably the acoustic sensors are arranged so that at least some sensors are deployed above ground level. Acoustic sensing can be improved by locating the sensors at an appropriate height above the ground. Different sensors may be located at different heights above the ground. By staggering the placement of sensor vertically the same principals of directional analysis can be used to locate airborne events.

The at least one sensor may additionally or alternatively comprise seismic sensors to detect ground vibration. Ground vibration can be usefully combined with acoustic sensing to detect vehicles passing nearby. In some circumstances however, such as troop movement nearby, the acoustic signature may be low but the seismic response is greater. Thus the combination of sensors can be used to extend the capabilities of the sensor module and collectively can yield more information for discrimination of events.

The sensor module may include one or more detection or imaging devices such as a camera operating in any or all of the visible, infrared or ultraviolet spectrum.

In another aspect, the invention provides a sensor network comprising a plurality of sensor modules each sensor module having a locator, a transceiver and a processor, the network being adapted so that the sensor modules communicate with each other and determine whether each sensor module should operate in a sensing mode or a controlling mode so as to most effectively identify and/or locate events in an area of interest.

DESCRIPTION OF THE FIGURES

The invention will now be described by way of example only with reference to the following drawings of which.

DETAILED DESCRIPTION OF THE INVENTION

Figure 1:
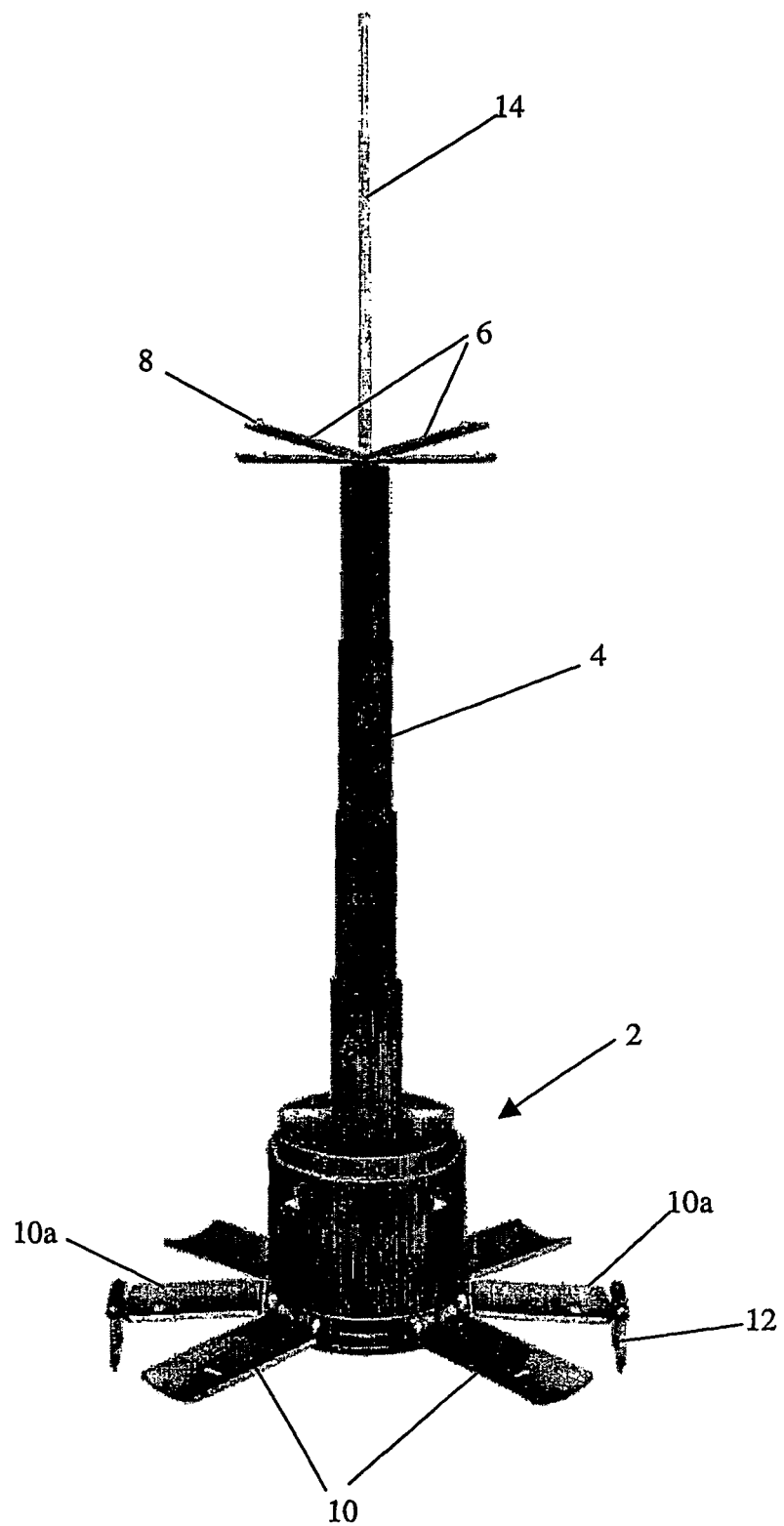
FIG. 1 shows a sensor module according to the present invention in deployed configuration.

Referring to FIG. 1 a sensor module according to the present invention is shown. The sensor module has a base portion 2 and a telescopic mast 4 which supports four arms 6. Each arm 6 carries a microphone 8. The sensor module also has several hinged flaps 10 forming a stand to give the module stability. Two of the flaps 10a carry seismic sensors 12 (more clearly shown in FIG. 3) which are hinged to the flaps 10a and penetrate the ground. An antenna 14, which is itself telescopic is also carried by the mast 4.

The base portion 2 contains the power source for the sensor module which is a long life battery. Also housed in the base portion is a circuit board which contains the processor of the sensor module. The base portion also houses the GPS receiver and the orientation sensor (not shown) although these could also be located in or on the telescopic mast or one of the deployable arms. The GPS receiver will be able to precisely locate the position of the module. The orientation sensor includes a magnetic sensor for locating magnetic north, in effect a compass, so that the direction to event can be established. The orientation sensor also determines orientation with respect to the vertical. Various suitable attitude sensor are well known to the skilled person.

Figure 2:
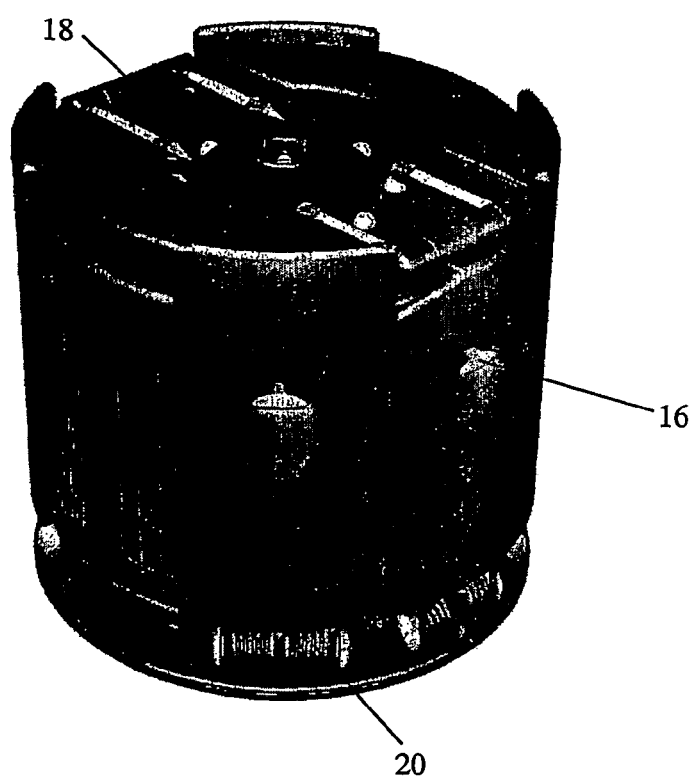
FIG. 2 shows a sensor module in a stowed configuration.

FIG. 1 shows the sensor module in its deployed configuration. However prior to deployment the sensor module is stored in a stowed configuration as shown in FIG. 2. In the stowed configuration the telescopic mast 4 is recessed within the base portion 2 as are the arms 6 and the antenna 14. Further the flaps 10 are held against the side of the base portion 2 by retaining clips 16 and the seismic sensors 12 are folded into a recess 18 in the top of the module. The module in the stowed configuration is therefore very compact. The module shown in FIGS. 1 and 3 has a stowed height of 100 mm and a diameter of 110 mm with a deployed height of 404 mm and an extended base diameter of about 350 mm although differently sized modules will be used in different circumstances.

It can be seen that in the stowed configuration the module is cylindrical to make it easier to deploy by various launch methods. Also the top of one module is designed to co-operate with the base of another module to aid stacking in a gun launch delivery vehicle or just for storage.

In use as mentioned the modules may be deployed by hand or launched towards the target area The modules may be dropped or launched by air platforms for instance such as fixed wing aircraft, helicopters or unmanned airborne vehicles (UAVs). Launch methods include shells (i.e. gun launch), rocket tubes, rockets or mortars. For the purposes of this specification deployment involving airborne flight/free-fall of the modules for at least part of the deployment shall be described as deployment from an elevated platform.

Figure 3:
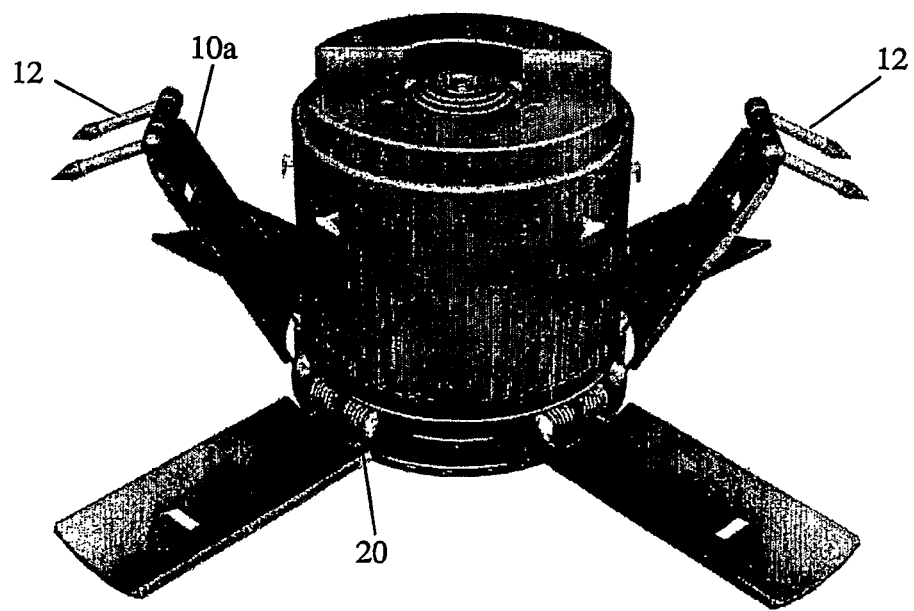
FIG. 3 illustrates the principle of how the sensor module deploys.
Figure 4:
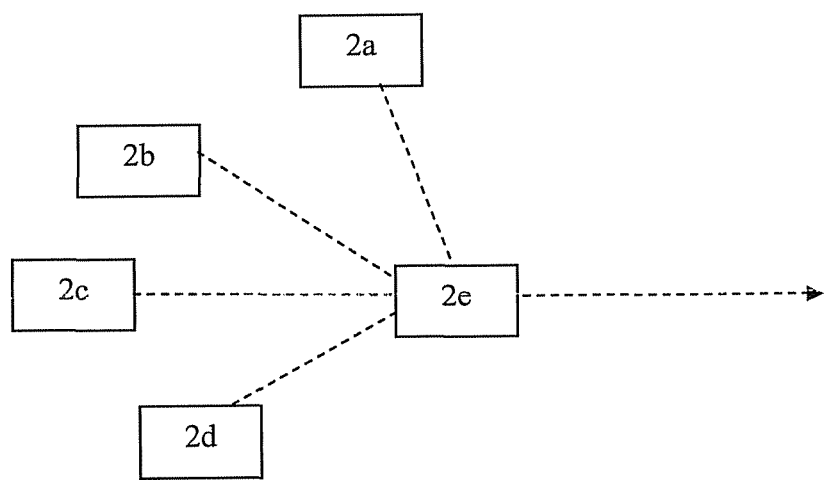
FIG. 4 is a box diagram of a basic network.

The modules are ruggardized to survive the accelerations and impact involved in gun/rocket launch and landing. Parachutes may or may not be provided depending on the type of module being used. The module is weighted so that the centre of gravity is towards the base of the module so that it is most likely to land on its base or side. Once the module has landed the deployment sequence begins. The retaining clips 16 are disengaged from the flaps 10 which are biased by springs 20 to the deployed position. The deployment of the flaps 10 will also cause a module lying on its side to be righted and stand on its base. As illustrated in FIG. 3 as the flaps 10a are deployed the seismic sensors 12 are rotated to be ground engaging by a two stage trigger release.

Deployment of the flaps, with the inherent self righting, releases a catch retaining the telescopic mast which is also biased by springs (not shown) into the deployed position. Springs are used as actuators for the flaps 10 and mast 4 as they are simple and inexpensive, consume no power and are robust enough to survive gun launch. However other actuators could be used if required and motors could be provided to aid deployment of certain sensors.

Once the retaining catch on the mast 4 is released the mast deploys and arms 6 deploy through gravity. Antenna 14 is deployed by any suitable actuator.

The sensor module is now fully deployed as shown in FIG. 1 and ready to detect events. However first the processor determines the module's location and orientation.

This may also involve doing an internal status check. The sensor module will then communicate with other sensor modules in the vicinity to produce a self organised network.

The sensor modules may be programmed with information about an area of interest either before or after deployment. Sensor modules which have deployed correctly and are located in an area of interest (2a, 2b, 2c, 2d) would generally act in a sensing mode. Sensor modules 2e) which are located out of the area of interest, for instance not far enough forward, or those that have not deployed correctly but can still communicate may be used in a controlling mode or as a communication relay—using a module which has deployed towards the rear as a communications relay can reduce the power needed for communications from the forward located modules and thus preserve the battery life of the sensors in areas of greatest interest.

When used for acoustic sensing the range of the sensor modules is approximately 500 m. Therefore the desired density of coverage is four modules in a square kilometre. The spacing of sensor modules from each other in therefore taken into account when organising the network.

The sensor shown with regard to FIGS. 1 to 3 can usefully be employed to detect a number of different events. The microphones 8 are arranged in a spaced array so as to detect acoustic signals coming from any direction. Further from the time interval in the signal reaching different microphones the direction of the source of the signal can be detected. When this information is combined with similar reports from other modules in the network the item causing the sound can be located. The acoustic signature can be analysed looking at frequency, waveform, duration, intensity etc. to try to classify the event. For instance the sound of an artillery unit firing a shell will be relatively short and loud whereas movement of a nearby tracked vehicle will tend to be more prolonged, quieter and rhythmic. The information from the seismic sensors can also be taken into account in identifying particular events and increases the capability of the sensor module.

The signal processing may be performed by the module that detects the event to determine the type of event and its direction. In such case all that needs to be communicated to the module acting in control mode is the type of event and the location information. However in some cases it may be better for the module acting in control mode to perform the analysis, in which case the detecting module will transmit the raw data signal to the control mode.

The sensor module may have additional sensors. For instance infrared detectors could be provided on the arm 8 arranged to look away from the detector. Weapons fire or vehicle engines can provide large infrared targets that can be detected. Visual band or ultraviolet cameras or detectors could also be provided. In other embodiments therefore additional sensors may be added. An alternative approach however is to have different sensor payloads which may be used with a common base portion. For instance sensor bearing telescopic mast 4 could be detachable from the base portion 2 and replaceable with a different payload. Modules having different sensor payloads could be deployed at the same time to provide a network with increased capability.

One payload that could be usefully employed could be a meteorological monitoring station. Knowledge of weather conditions in the area of interest can be important for various reasons. The sensor payload may therefore comprise various weather monitoring sensors, for instance temperature, humidity, windspeed sensors etc. These sensors could be carried at appropriate places on a telescopic mast similar to the embodiment illustrated or they could be periodcially launched on small weather balloons filled from a store of compressed helium.

It will therefore be apparent that a variety of sensor packages can be rapidly deployed to form a self organising network for area monitoring. As discussed the invention has military applications and can perform various functions; weapon location, monitoring of troop movements, perimeter security etc.

The invention can also be applied to civil applications. For instance perimeter security may be required at various events. Where an area needs to be rapidly secured or a large perimeter needs to be monitored sensor modules can be scattered around the perimeter to detect intruders. For such applications all that may be required is an acoustic sensor or a small number of infrared detectors and the modules may be very small so as to be less noticeable.

Due to the low cost of production and deployment the invention could be useful for border control. A first deployment could be made to provide a network with enough power for a certain period of time. As the modules start to run out of power another deployment could be made with modules in different places so as to prevent smugglers and the like from learning the module positioning.

Another possible application for the sensor modules and network of the present invention is in disaster relief. Following disasters such as earthquakes, landslides or explosions there is a requirement to quickly locate causalities and trapped individuals for rescue. Usually this is done by search and rescue teams backed up with thermal imagers etc. Often however personnel can be limited, the area to search can be large and certain parts may be unreachable.

In such situations a plurality of sensor modules according to the present invention could be air deployed over the affected region and provided with infrared imagers and/or acoustic sensors. This can provide rapid area cover of the disaster area. Whilst the search and rescue teams were working in some areas the sensor network would organise itself to effectively cover the rest of the area and look/listen for tell tale signs of people needing assistance. When a casualty is detected the network would inform the rescue base and help could be dispatched.

Other applications of the invention and variations thereon will be apparent to those skilled in the art and are considered within the scope of this invention.

The invention claimed is:

1. A sensor module for use in a sensor network, the sensor module comprising at least one sensor, a locator for determining the location of the at least one sensor, a transceiver for communicating with other sensor modules and/or a base station and a processor wherein the processor is adapted, in use, to communicate with other sensor modules and to determine whether the sensor module should operate in a sensing mode or a controlling mode within the network.

2. A sensor module as claimed in claim 1 wherein the processor is adapted to consider the location of the sensor module with the location of other sensor modules in determining whether the sensor module should operate in a sensing mode or a controlling mode within the network.

3. A sensor module as claimed in claim 1 wherein in sensing mode the processor monitors the output of the at least one sensor to detect events.

4. A sensor module as claimed in claim 1 wherein in controlling mode the processor monitors receives information from other sensor modules and transmits information regarding events to a base station.

5. A sensor module as claimed in claim 1 wherein, in controlling mode, the processor periodically reviews whether the sensor module should operate in a sensing mode or a controlling mode within the network.

6. A sensor module as claimed in claim 1 wherein the module includes a means of determining or estimating remaining power and the processor considers remaining power in determining whether the sensor module should operate in a sensing mode or a controlling mode within the network.

7. A sensor module as claimed in claim 1 wherein the sensor module is deployable from a stowed configuration to a deployed configuration.

8. A sensor module as claimed in claim 7 wherein the sensor module is adapted such that in the stowed configuration it may be co-operatively stacked with other sensor modules.

9. A sensor module as claimed in claim 7 wherein the sensor module comprises means for automatically deploying from the stowed configuration to the deployed configuration.

10. A sensor module as claimed in claim 1 comprising a self-righting means.

11. A sensor module as claimed in claim 1 comprising an extendable portion.

12. A sensor module as claimed in claim 11 wherein one or more sensors are supported on the extendable portion so as to be located above ground level.

13. A sensor module as claimed in claim 1 wherein the sensor module comprises a base portion releasable connectable to a payload portion.

14. A sensor module as claimed in claim 13 wherein the base portion contains the processor, the transceiver and a power source.

15. A sensor module as claimed in claim 13 wherein the payload portion comprises the at least one sensor.

16. A sensor module as claimed in claim 1 wherein the locator comprises a GPS receiver.

17. A sensor module as claimed in claim 1 further comprising an orientation sensor for determining the orientation of the module.

18. A sensor module as claimed in claim 17 wherein the orientation sensor determines magnetic north.

19. A sensor module as claimed in claim 17 wherein the orientation sensor determines the orientation of the module to the vertical.

20. A sensor module as claimed in claim 1 wherein the at least one sensor comprises one or more of an acoustic sensor, a seismic sensor, an infrared detector, an ultraviolet detector and a visible band camera.

21. A sensor module as claimed in claim 20 wherein there are a plurality of acoustic sensors arranged in a spaced array.

22. A sensor network comprising a plurality of sensor modules each sensor module having a locator, a transceiver and a processor, the network being adapted so that the sensor modules communicate with each other and determine whether each sensor module should operate in a sensing mode or a controlling mode so as to most effectively identify and/or locate events in an area of interest.

* * * * *